United States Patent Office 3,658,913
Patented Apr. 25, 1972

3,658,913
AQUEOUS FORMALDEHYDE SOLUTION STABILIZED BY SYNERGIC MIXTURES OF AMINOTRIAZINE
Ibrahim Dakli, Busto Arsizio, Varese, Angelo Demicheli, Saronno, Varese, and Giuseppe Gregori, Busto Arsizio, Varese, Italy, assignors to Montecatini Edison S.p.A., Milan, Italy
No Drawing. Filed July 15, 1968, Ser. No. 744,624
Claims priority, application Italy, July 17, 1967, 18,476/67
Int. Cl. C07c 47/04
U.S. Cl. 260—606                         1 Claim

ABSTRACT OF THE DISCLOSURE

Described are aqueous formaldehyde solutions containing or not containing methanol, which remain stable for longer storage times, at lower temperature with higher $CH_2O$ concentration. The solutions contain as stabilizing agents synergistic mixes constituted by:
(A) melamine or its methylol derivatives;
(B) at least one of the guanamine derivatives or their methylol derivatives whose general formula is:

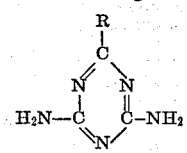

wherein R may be alkyl with between 1 to 20 carbon atoms, aryl, a hydrogenated aryl, an alkylaryl, an alkyl or phenyl substituted aryl, or a polyaryl.

---

The present invention has for its object the preparation of stable aqueous formaldehyde solutions with concentrations equal to or greater than 36% by weight, and optionally containing methanol. The solutions are free from the precipitation of the paraformaldehyde for longer periods of time and at considerably lower temperatures both with respect to normal non-stabilized formaldehyde solutions as well as to formaldehyde solutions stabilized with means different from those forming the object of this invention and which are usable in all fields of application.

Different processes are known for stabilizing aqueous solutions of formaldehyde in order to delay the above-mentioned precipitation phenomenon. It is also known that the greatest part of these processes consists in adding to the solutions particular stabilizing agents.

The main known compounds used for this purpose are:

(a) Methanol (Walcher "Formaldehyde" Reinhold Publishing Co. (1964), p. 94–96);
(b) Melamine (U.S. Pat. 2,237,092 (1941) American Cyanamid);
(c) Urea and/or its derivatives (U.S. Pat. No. 2,000,152 (1935) Du Pont);
(d) Derivatives from cellulose (U.S. Pat. No. 3,137,736 (1964) Celanese); Sorbitol esters with fatty acids (U.S. Pat. 3,183,271 (1965) Borden); Amides (British Pat. No. 1,012,824 (1965) Commercial Solvents); Polyvinylalcohol (British Pat. 968,762 (1964) I.C.I.);
(e) Derivatives of guanamine (Belgian Pat. Nos. 664,428, 663,830, 623,697 Montecatini-Edison; U.S. application Ser. No. 406,897, now U.S. Pat. No. 3,423,467 of Dakli et al).

The compound under (a) has economical and technological drawbacks that often discourage its use. In fact, in order to obtain effective stabilization of the formaldehyde solution, considerable quantities must be used (7–14% by weight on the stabilized formaldehyde solution), which causes considerable economical burdens and a slowing down of the condensation kinetics.

The compounds of (b) and (c), although on one hand they partially eliminate the drawbacks of methanol (slowing down of the condensation kinetics), on the other hand they still must be used in considerable quantities (melamine 2–10% by weight, urea and/or its derivatives 5–10% by weight on the stabilized solutions), while not allowing the polyvalent use of formaldehyde solutions.

Each of the two types of stabilizers, as a matter of fact, owing to the great quantities in which they are present in the aqueous formaldehyde solutions, restrict the use of the formaldehyde to specific types of condensation in the sense that the solutions stabilized with melamine will be used for the preparation of resins based on melamine/formaldehyde, while the solutions stabilized with urea and/or its derivatives, will be used for the preparation of resins based on urea/formaldehyde.

The compounds of point (d) are used in modest quantities (maximum 0.1% by weight on stabilized formaldehyde solutions) and the formaldehyde thus obtained may be used for any type of synthesis.

However, the stabilizing effect exerted is rather moderate, particularly at the low storage temperatures.

The compounds of (e) are the most interesting of the known stabilizers inasmuch as, though used with very low concentrations (0.1–0.2% by weight on the stabilized formaldehyde solutions) they impart to the formaldehyde solutions a high stability under low storage temperatures.

Most of the guanamine derivatives, however, are commercially available at rather high prices.

We have surprisingly found that aqueous solutions of formaldehyde, having concentrations equal to or greater than 36%, are stabilized in a much more effective way if, instead of using melamine singly or at least one of the derivatives of guanamine, mixtures of these two compounds are used.

Such mixtures actually show clearly a synergistic effect with regard to the stabilization of the formaldehyde solutions. This is so much the more surprising if one considers the fact that such synergistic action does not exist when mixtures of guanamine derivatives are used to stabilize the formaldehyde solutions.

Thus, this invention represents something new in respect to the prior art inasmuch as:

It allows obtaining formaldehyde solutions which are much more stable for storage (down to −15° C.) than anything known so far.

It allows achieving this effect with much lesser quantities of melamine (of standard industrial manufacture) and of guanamine derivatives than would be necessary, in order to obtain the same effects, when the melamine and the guanamine are used separately.

The guanamine derivatives which, according to this invention, act synergistically together with the melamine with regard to the stabilization of the formaldehyde solutions, have the formula:

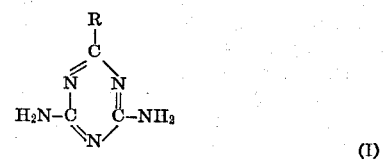

(I)

wherein R may be an alkyl containing between 1 and 20 carbon atoms, an aryl, a hydrogenated aryl, an alkylaryl, a phenyl or alkyl substituted aryl, or a polyaryl.

Both the melamine, as well as the above indicated guanamines, may be used in the form of methylol derivatives, of condensates with aldehydes or of organic and inorganic salts.

The quantities of stabilizer preferably used according to this invention are such that 100 parts by weight of aqueous solution of stabilized formaldehyde shall contain from 0.1% to 1% by weight of melamine and from 0.001% to 0.1% by weight of guanamine derivatives of Formula I. It is evident, however, that the melamine-guanamine derivative mixtures are also synergistic for the stabilization of the aqueous formaldehyde solutions in concentrations lower or higher than the limits indicated above.

The stabilization of the formaldehyde solutions is conducted by reacting the stabilizing synergistic mixture with the formaldehyde solutions to be stabilized, within a wide range of temperatures, from 30° C. to 100° C., but preferably from 40° to 70° C., for a time comprised between 30 minutes and 10 hours and at a pH value comprised between 2.5 and 6.0, but preferably between 3.0 and 5.0. The stabilizing time is inversely proportional to the temperature used.

The stability of the formaldehyde solutions grows, as a matter of fact, within certain limits, with the increasing of the stabilizing time at a certain temperature and, for a certain stabilizing time, increases within certain limits with the risng of the temperature. The stabilization of the formaldehyde solutions may be carried out in the formaldehyde producing plant, without the need of setting up additional equipment.

The following are a few examples for illustrating this invention without limiting it. Also given are some comparative examples to show that:

The aqueous formaldehyde solutions stabilized with the individual stabilizers (melamine or guanamine derivatives) show an appreciably smaller stability with respect to the solutions stabilized with the synergistic mixures that are the object of the present invention.

The use of mixtures of guanamine derivatives has no synergistic effect as far as the stabilization of the aqueous formaldehyde solutions is concerned (see the comparative examples).

Finally, for clearness' sake, it is poined out that in the examples the stabilities of the aqueous formaldehyde solutions are given as the time (in hours or days, depending on the indications) during which they keep free from the formation of paraformaldehyde and that the concentrations of the same solutions and of the stabilizer are expressed in percent by weight.

EXAMPLES 1–6

0.3% by weight of melamine and 0.01% by weight of six different guanamine derivatives were added respectively to six samples of a 36% aqueous formaldehyde solution having a pH of 3.5.

Each sample was then made to react for 4 hours at 50° C. under stirring and, at reaction completion, was cooled down and stored at three different temperatures (−15° C., −10° C. and 0° C.).

Table 1 reports the stability values obtained.

EXAMPLES 7–11

A mixture constituted by 0.3% by weight of melamine and 0.01% by weight of five guanamine derivatives was added to five samples of a 36% formaldehyde solution having a pH of 4.

Each sample was made to react for 6 hours at 40° C. under stirring and, at reaction completion, was cooled down and stored at −15° C. and at −10° C. The stability values obtained are reported in Table 2.

EXAMPLES 12–17

A mixture of melamine and lauroguanamine in varying quantities was added respectively to six samples of a 36% formaldehyde solution having a pH of 3.7.

Each sample was made to react for 2 hours at 60° C. under stirring and, at reaction completion, was cooled down and then stored at two different temperatures. The stability values obtained are reported in Table 3.

EXAMPLE 18

0.3% by weight of melamine and 0.03% by weight of lauroguanamine were added to a 40% aqueous formaldehyde solution having a pH of 3.2.

The solution thus treated was then made to react for 2 hours at 60° C. under stirring and, at reaction completion, was cooled down and stored at −10° C. and 0° C. The stability of the sample stored at −10° C. was 10 days, while that of the sample stored at 0° C. was 30 days.

EXAMPLE 19

0.5% by weight of melamine and 0.05% by weight of lauroguanamine were added to a 45% aqueous formaldehyde solution having a pH of 3.0.

The solution thus treated was then made to react for 2 hours at 60° C. under stirring and, at reaction completion, was cooled down and stored at 0° C. and at +10° C. The stability of the sample stored at 0° C. was 7 days; the stability of the sample stored at +10° C. was 30 days.

EXAMPLE 20

1% by weight of melamine and 0.07% by weight of lauroguanamine were added to a 50% aqueous formaldehyde solution having a pH of 3.0.

The solution thus treated was made to react at 70° C. for 1 hour under stirring and, at reaction completion, was cooled down and stored at +10° C. and at +15° C. The stability of the sample stored at +10° C. was 12 days, while the stability of the sample stored at +15° C. was 30 days.

Comparative Examples I–VII

For the comparing of the main examples from 1 to 6, 0.3% by weight of melamine or 0.01% by weight of six different guanamine derivatives were added respectively to seven samples of a 36% aqueous formaldehyde solution with a pH of 3.5.

Each sample was then made to react for 4 hours at 50° C. under stirring and, at reaction completion, was cooled down and then stored at three different temperatures (i.e.: at −15° C., −10° C. and at 0° C.). Table 4 records all the stability values obtained.

Comparative Examples VIII–XII

For comparing the main examples from 7 to 11, 0.01% by weight of five different guanamine derivatives were added respectively to five samples of a 36% aqueous solution of formaldehyde having a pH of 4.

Each sample was made to react for 6 hours at 40° C. under stirring and, at reaction completion, was then cooled down and stored at −15° C. and at −10° C. Table 5 records the stability values obtained.

Comparative Example XIII–XVIII

For comparing the main Examples from 12 to 17, varying quantities of melamine and varying quantities of lauroguanamine were added to six samples of a 36% aqueous formaldehyde solution having a pH of 3.7.

Each sample was made to react for 2 hours at 60° C., under stirring, and, at reaction completion, was then stored at −10° C. and at 0° C.

Table 6 records all the stability values obtained.

Comparative Examples XIX–XX

For comparison with the main Example 18, 0.3% by weight of melamine or 0.03% by weight of lauroguanamine were added respectively to two samples of a 40% aqueous formaldehyde solution having a pH of 3.2.

The solution thus treated were then made to react for two hours at 60° C. and, at reaction completion, were cooled down and then stored at −10° C., and at 0° C.

Table 7 records all the stability values obtained.

Comparative Examples XXI–XXII

For comparison with the main Example 19, to two samples of a 45% aqueous formaldehyde solution having a pH of 3.0, were added 0.5% by weight of melamine or 0.05% by weight of lauroguanamine.

The solutions thus treated were made to react for 2 hours at 60° C. under stirring and, at reaction completion, were cooled down and then stored at 0° C. and at +10° C.

Table 8 records all the stability values obtained.

Comparative Examples XXIII–XXIV

For comparison with the main Example 20, 1% by weight of melamine or 0.07% by weight of lauroguanamine were added respectively to the two samples of a 50% aqueous formaldehyde solution having a pH of 3.0.

The solutions thus treated were then made to react for one hour at 70° C. under stirring and, at reaction completion, were cooled down and then stored at +10° C. and at +15° C.

Table 9 records all the stability values obtained.

Comparative Examples XXV–XXVII

To three samples of a 36% aqueous solution of formaldehyde having a pH of 3.5, were added mixes of guanamine derivatives in quantities of the same order as those according to this invention.

Each sample was made to react for 4 hours at 50° C. under stirring and, on completion of the reaction, was then cooled down and stored at two different temperatures (−10° C. and 0° C.).

Table 10 records the stability values of the formaldehyde solutions at 36%, treated under the same conditions with the single guanamine derivatives not in admixture with each other.

TABLE 1

Examples from 1 to 6—Stability of 36% formaldehyde solutions treated with 0.3% by weight of melamine and with 0.01% by weight of guanamine.

| Example | Mixture of stabilizers used | Stability in days at the temperature of— | | |
|---|---|---|---|---|
| | | −15° C. | −10° C. | 0° C. |
| 1 | Propioguanamine-melamine | 2 | 5 | 15 |
| 2 | Caproguanamine-melamine | 3 | 8 | 20 |
| 3 | Caprylguanamine-melamine | 5 | 12 | 30 |
| 4 | Caprinoguanamine-melamine | 7 | 30 | >30 |
| 5 | Lauroguanamine-melamine | 12 | >30 | >30 |
| 6 | Benzoguanamine-melamine | 5 | 10 | 30 |

TABLE 2

Examples from 7 to 11—Stability of 36% formaldehyde solutions treated with mixtures of 0.3% of melamine and 0.01% of guanamine derivatives.

| Example | Mixture of stabilizers used | Stability in days at the temperature of— | |
|---|---|---|---|
| | | −15° C. | −10° C. |
| 7 | Tetrahydrobenzoguanamine-melamine | 3 | 6 |
| 8 | Phenylacetobenzoguanamine-melamine | 3 | 8 |
| 9 | Meta-butylbenzoguanamine-melamine | 8 | 20 |
| 10 | Meta-phenylbenzoguanamine-melamine | 10 | 30 |
| 11 | Beta-naphthoguanamine-melamine | 12 | >30 |

TABLE 3

Examples from 12 to 17—Stability of 36% formaldehyde solutions treated with mixes of lauroguanamine and melamine in varying quantities.

| Example | Mixture of stabilizers | | Stability in days at the temperature of— | |
|---|---|---|---|---|
| | Type | Quantity, percent | −10° C. | 0° C. |
| 12 | Lauroguanamine | 0.005 | 4 | 15 |
| | Melamine | 0.1 | | |
| 13 | Lauroguanamine | 0.005 | 13 | >30 |
| | Melamine | 0.2 | | |
| 14 | Lauroguanamine | 0.005 | 15 | >30 |
| | Melamine | 0.3 | | |
| 15 | Lauroguanamine | 0.001 | 5 | 20 |
| | Melamine | 0.2 | | |
| 16 | Lauroguanamine | 0.002 | 8 | 30 |
| | Melamine | 0.2 | | |
| 17 | Lauroguanamine | 0.003 | 10 | >30 |
| | Melamine | 0.2 | | |

TABLE 4

Comparative examples from I to VII—Stability of 36% aqueous formaldehyde solutions treated with either melamine alone at 0.3% by weight or with only guanamine derivatives at 0.01% by weight.

| Comparative example | Stabilizer | | Stability at the temperature of— | | |
|---|---|---|---|---|---|
| | Type | Quantity, percent | −15° C. | −10° C. | 0° C. |
| I | Melamine | 0.3 | 10 hours | 1 day | 8 days |
| II | Propioguanamine | 0.01 | 1 hour | 2 hours | 5 hours |
| III | Caproguanamine | 0.01 | do | 5 hours | 1 day |
| IV | Caprylguanamine | 0.01 | 2 hours | 15 hours | 2 days |
| V | Caprinoguanamine | 0.01 | 4 hours | 1 day | 6 days |
| VI | Lauroguanamine | 0.01 | 1 day | 2 days | 15 days |
| VII | Benzoguanamine | 0.01 | 1 hour | 10 hours | 1 day |

TABLE 5

Comparative examples VIII to XII—Stability of 36% formaldehyde solutions treated with 0.01% by weight of some of the guanamine derivatives.

| Comparative example | Type of stabilizer | Stability at a temperature of— | |
|---|---|---|---|
| | | −15° C. | −10° C. |
| VIII | Tetrahydrobenzoguanamine | 1 hour | 2 hours |
| IX | Phenylacetoguanamine | do | Do. |
| X | Meta-butylbenzoguanamine | 2 hours | 5 hours |
| XI | Meta-phenylbenzoguanamine | do | 6 hours |
| XII | Beta-naphthoguanamine | do | 10 hours |

TABLE 6

Comparative examples from XIII to XVIII—Stability of 36% formaldehyde solutions treated with melamine only or with lauroguanamine only.

| Comparative example | Stabilizer | | Stability at a temperature of— | |
|---|---|---|---|---|
| | Type | Quantity, percent | −10° C. | 0° C. |
| XIII | Melamine | 0.1 | 5 hours | 3 days |
| XIV | do | 0.2 | 16 hours | 5 days |
| XV | Lauroguanamine | 0.001 | 1 hour | 16 hours |
| XVI | do | 0.002 | 2 hours | 1 day |
| XVII | do | 0.003 | 10 hours | 4 days |
| XVIII | do | 0.005 | 1 day | 7 days |

TABLE 7

Comparative examples from XIX and XX—Stability of 40% formaldehyde solutions treated either with melamine alone at 0.3% by weight or with lauroguanamine alone at 0.03% by weight.

| Comparative example | Stabilizer | | Stability at a temperature of— | |
|---|---|---|---|---|
| | Type | Quantity, percent | −10° C. | 0° C. |
| XIX | Melamine | 0.03 | 10 hours | 1 day |
| XX | Lauroguanamine | 0.03 | 1 day | 9 days |

TABLE 8

Comparative examples from XXI to XXII—Stability of 45% formaldehyde solutions treated with melamine only at 0.5% by weight or with lauroguanamine alone at 0.05% by weight.

| Comparative example | Stabilizer | | Stability at a temperature of— | |
|---|---|---|---|---|
| | Type | Quantity, percent | 0° C. | +10° C. |
| XXI | Melamine | 0.51 | 1 hour | 5 hours. |
| XXII | Lauroguanamine | 0.05 | 16 hours | 6 days. |

TABLE 9

Comparative examples from XXIII to XXIV—Stability of 50% formaldehyde solutions treated with melamine alone at 1% by weight or with lauroguanamine alone at 0.07% by weight.

| Comparative example | Stabilizer | | Stability at a temperature of | |
|---|---|---|---|---|
| | Type | Quantity, percent | 0° C. | +10° C. |
| XXIII | Melamine | 1 | 1 hour | 10 hours. |
| XXIV | Lauroguanamine | 0.07 | 10 hours | 4 days. |

TABLE 10

Comparative examples from XXV to XXVII—Comparison between the stability of 36% aqueous formaldehyde solutions treated with mixtures of guanamine and that of 36% formaldehyde solutions treated under the same conditions but with the single guanamine in the quantities foreseen by our invention.

| Comparative example | Stabilizer | | Stability at a temperature of— | |
|---|---|---|---|---|
| | Type | Quantity, percent | −10° C. | 0° C. |
| XXV | {Lauroguanamine<br>Benzoguanamine<br>Lauroguanamine<br>Benzoguanamine | 0.005<br>0.01<br>0.005<br>0.01 | }1 day<br><br>do<br>}10 hours | 8 days.<br><br>7 days.<br>1 day. |
| XXVI | {Lauroguanamine<br>Caprylguanamine<br>do | 0.005<br>0.01<br>0.01 | }1 day<br><br>}15 hours | 8 days.<br><br>2 days. |
| XXVII | {Lauroguanamine<br>Caprinoguanamine<br>do | 0.005<br>0.01<br>0.01 | }1 day<br><br>do | 11 days.<br><br>6 days. |

We claim:
1. An aqueous formaldehyde solution of at least 36% concentration, containing by weight of aqueous solution of stabilized formaldehyde as a stabilizing agent a mix of
(A) 0.1 to 1.0% melamine or its methylol derivatives; and
(B) 0.001 to 0.1% of at least one guanamine derivative or its methylol derivatives selected from the group consisting of propioguanamine, caproguanamine, caprylguanamine, caprinoguanamine, lauroguanamine, benzoguanamine, tetrahydrobenzoguanamine, phenyl acetobenzoguanamine, meta-butyl benzoguanamine, meta-phenylbenzo-guanamine and beta-naphthoguanamine.

References Cited

UNITED STATES PATENTS 3,423,467  1/1969  Dakli et al. _____ 260—606
2,237,092  4/1941  Swain _____ 260—606

FOREIGN PATENTS 1,029,039  5/1966  Great Britain _____ 260—606
1,205,073  11/1965  Germany _____ 260—606

BERNARD HELFIN, Primary Examiner

R. H. LILES, Assistant Examiner